United States Patent
Lu (10) Patent No.: US 9,496,711 B2
(45) Date of Patent: Nov. 15, 2016

(54) ELECTRICAL SOCKET HAVING INDICATORS AND DISPLAY FOR WARNING SURGE

(71) Applicant: Wei-Chen Lu, Taichung (TW)

(72) Inventor: Wei-Chen Lu, Taichung (TW)

(73) Assignee: YI JIA TECH CO., LTD, Taichung (TW)

( * ) Notice: Subject to any disclaimer, the term of this patent is extended or adjusted under 35 U.S.C. 154(b) by 90 days.

(21) Appl. No.: 14/609,769

(22) Filed: Jan. 30, 2015

(65) Prior Publication Data

US 2016/0226242 A1    Aug. 4, 2016

(51) Int. Cl.
*H02H 9/04* (2006.01)
*H05K 5/00* (2006.01)
*H01R 13/66* (2006.01)
*H01R 13/717* (2006.01)

(52) U.S. Cl.
CPC .............. *H02H 9/04* (2013.01); *H01R 13/665* (2013.01); *H01R 13/7175* (2013.01); *H05K 5/0017* (2013.01)

(58) Field of Classification Search
CPC .. H02H 9/04; H01R 13/665; H01R 13/7175; H05K 5/0017
USPC ........................................................ 361/118
See application file for complete search history.

(56) References Cited

U.S. PATENT DOCUMENTS

| | | | | |
|---|---|---|---|---|
| 7,242,566 B2 * | 7/2007 | Yegin | ..................... | H02H 9/042 361/111 |
| 2004/0085696 A1 * | 5/2004 | Mendoza | ............... | H02H 3/048 361/93.1 |
| 2008/0266906 A1 * | 10/2008 | Park | ..................... | H02M 3/156 363/16 |
| 2011/0299210 A1 * | 12/2011 | Wang | ..................... | H02H 9/007 361/118 |
| 2012/0086632 A1 * | 4/2012 | Lin | ......................... | G09G 5/22 345/156 |

* cited by examiner

*Primary Examiner* — Scott Bauer (57) ABSTRACT

An electrical socket is provided with a ground; a neutral; and a line. The socket further includes female contact elements electrically connected to the ground, the neutral, and the line; line contacts electrically connected to the ground, the neutral, and the line; a surge protection module electrically connected to the ground, the neutral, and the line, the surge protection module including surge protection pairs; a count power module electrically connected to the surge protection module and including a bridge rectifier for converting AC to DC as output; and a count display module including a CPU electrically connected to the DC output, a surge detecting circuit electrically connected to the surge protection module for detecting a surge signal, and electrically connected to the CPU to send the detected surge signal to the CPU, and a display electrically connected to the CPU for displaying a count of the detected surge signal.

3 Claims, 9 Drawing Sheets

ELECTRICAL SOCKET HAVING INDICATORS AND DISPLAY FOR WARNING SURGE

BACKGROUND OF THE INVENTION

1. Field of the Invention

The invention relates to protection against electrical surges and spikes and more particularly to an electrical socket having a surge protector, indicators and a display for showing occurrence of surge as a warning.

2. Description of Related Art

Overvoltage may occur on an electrical device in use. The electrical device may be damaged if it is equipped with protection means against electrical surges and spikes. A surge protector is used to limit voltage supplied to an electric device by either blocking or by shorting to ground any unwanted voltages above a safe value. Conventionally, a surge protector is not designed to detect voltage spikes. It only works when voltage spikes occur. To the worse, people may be not certain whether the surge protector works or not prior to malfunction of the electrical device.

Thus, the need for improvement still exists.

SUMMARY OF THE INVENTION

It is therefore one object of the invention to provide an electrical socket comprising a ground; a neutral; a line; a plurality of female contact elements electrically connected to the ground, the neutral, and the line; a plurality of line contacts electrically connected to the ground, the neutral, and the line; a surge protection module electrically connected to the ground, the neutral, and the line, the surge protection module including a plurality of surge protection pairs; a count power module electrically connected to the surge protection module and including a bridge rectifier for converting alternating current (AC) to direct current (DC) as output; and a count display module including a central processing unit (CPU) electrically connected to the output of the count power module, a surge detecting circuit electrically connected to the surge protection module for detecting a surge signal, and electrically connected to the CPU to send the detected surge signal to the CPU, and a display electrically connected to the CPU for displaying a count of the detected surge signal calculated by the CPU.

Preferably, the surge protection module further comprises a circuit breaker electrically connected to the line, a first inductor electrically connected to the neutral, a second inductor electrically connected to the line, a first capacitor electrically connected to the line and the neutral, and a second capacitor electrically connected to the line and neutral.

Preferably, the surge protection pairs include a first surge protection pair electrically connected to the line and the ground, a second surge protection pair electrically connected to the line and the ground, a third surge protection pair electrically connected to the line and the neutral, a fourth surge protection pair electrically connected to the line and the neutral, and a fifth surge protection pair electrically connected to the line and the neutral.

Preferably, the count power module further comprises a fuse electrically connected to the line; the bridge rectifier electrically connected to the neutral and the line via the fuse; a transformer including a primary winding electrically connected to the bridge rectifier, and a secondary winding; a first integrated circuit (IC) electrically interconnected the bridge rectifier and the primary winding of the transformer; a second light-emitting diode (LED) being in series connection to the secondary winding of the transformer; a third capacitor being in parallel connection to the transformer; a fourth capacitor electrically connected to the secondary winding of the transformer; a fifth capacitor electrically connected across the secondary winding; a second IC electrically interconnected the secondary winding of the transformer and the first IC to form a circuit is formed; and a Zener diode and a second resistor electrically interconnected the second IC and the secondary winding of the transformer.

Preferably, the count display module further comprises an operation display circuit electrically connected to the CPU and including a first resistor electrically connected to the CPU, and a first LED electrically connected to the first resistor; a voltage regulator electrically connected to the neutral, the line, and the CPU respectively and including a first capacitor; a trigger signal display circuit electrically connected to the surge detecting circuit and including a second resistor electrically connected to the CPU, and a second LED electrically connected to the first resistor; a count storage circuit electrically connected to the CPU and including a random access memory (RAM) for storing the count of the detected surge signal, a first transistor, a fourth resistor, a fifth resistor, and a sixth resistor electrically interconnected; and a count reset circuit electrically connected to the CPU and including a reset button, a fourth capacitor, and a seventh resistor electrically interconnected; and wherein the surge detecting circuit includes a variable resistor (VR), a first Zener diode, a timer, a second capacitor, a third resistor, and a third capacitor electrically interconnected.

Preferably, further comprises a front cover plate; a rear housing releasably secured to the cover plate; and a board assembly disposed in both the cover plate and the housing; wherein the surge protection module, the count power module, and the count display module are disposed on the board assembly; wherein the first LED of the count display module is disposed on the cover plate; wherein the second LED of the count display module is disposed on the cover plate; wherein the VR of the count display module is disposed on the cover plate; wherein the reset button of the count display module is disposed on the cover plate; wherein the display of the count display module is disposed on the cover plate; wherein the female contact elements are disposed on the board assembly and are accessible through the cover plate; and wherein the line contacts are disposed on the board assembly and are accessible through the housing.

The invention has the following advantages: The circuit breaker can protect the surge protection module from damage caused by overload or short circuit by detecting a fault condition and interrupting current flow through line. The first LED can emit light to indicate that the CPU is operating. The conducted second LED can emit light to indicate that voltage spikes occur in the surge protection module. The first LED and the second LED are dimmed when current is interrupted by the circuit breaker or power supplied to the ground, the neutral, and the line is interrupted so that status of the socket can be visually determined. Both terminals of the first surge protection pair are electrically connected to the line and the ground respectively, both terminals of the second surge protection pair are electrically connected to the line and the ground respectively, both terminals of the third surge protection pair are electrically connected to the line and the neutral respectively, both terminals of the fourth surge protection pair are electrically connected to the line and the neutral respectively, and both terminals of the fifth surge protection pair are electrically connected to the line and the neutral respectively so that the surge protection module can be protected from voltage spikes. The CPU counts the number of occurrence of the voltage spikes and the count is displayed on the display. The RAM has a non-volatile memory for storing surge data so that data stored in the RAM can be displayed on the display again even after power is interrupted. A pressing of the reset button resets the count. The variable resister of the surge detecting circuit can adjust voltage, i.e., adjusting sensitivity.

The above and other objects, features and advantages of the invention will become apparent from the following detailed description taken with the accompanying drawings.

DETAILED DESCRIPTION OF THE INVENTION

Referring to FIGS. 1 to 7C, an electrical socket 40 in accordance with the invention is shown. The socket 40 comprises a front cover plate 41, a rear housing 42 releasably secured to the cover plate 41, a board assembly 43 disposed in both the cover plate 41 and the housing 42, a plurality of female contact elements 44 mounted on the board assembly 43, and a plurality of line contacts 45 mounted on the housing 42. The board assembly 43 includes a rear board 431 electrically connected to the line contacts 45, an intermediate board 432, and a front board 433 electrically connected to the female contact elements 44.

Figure 4:
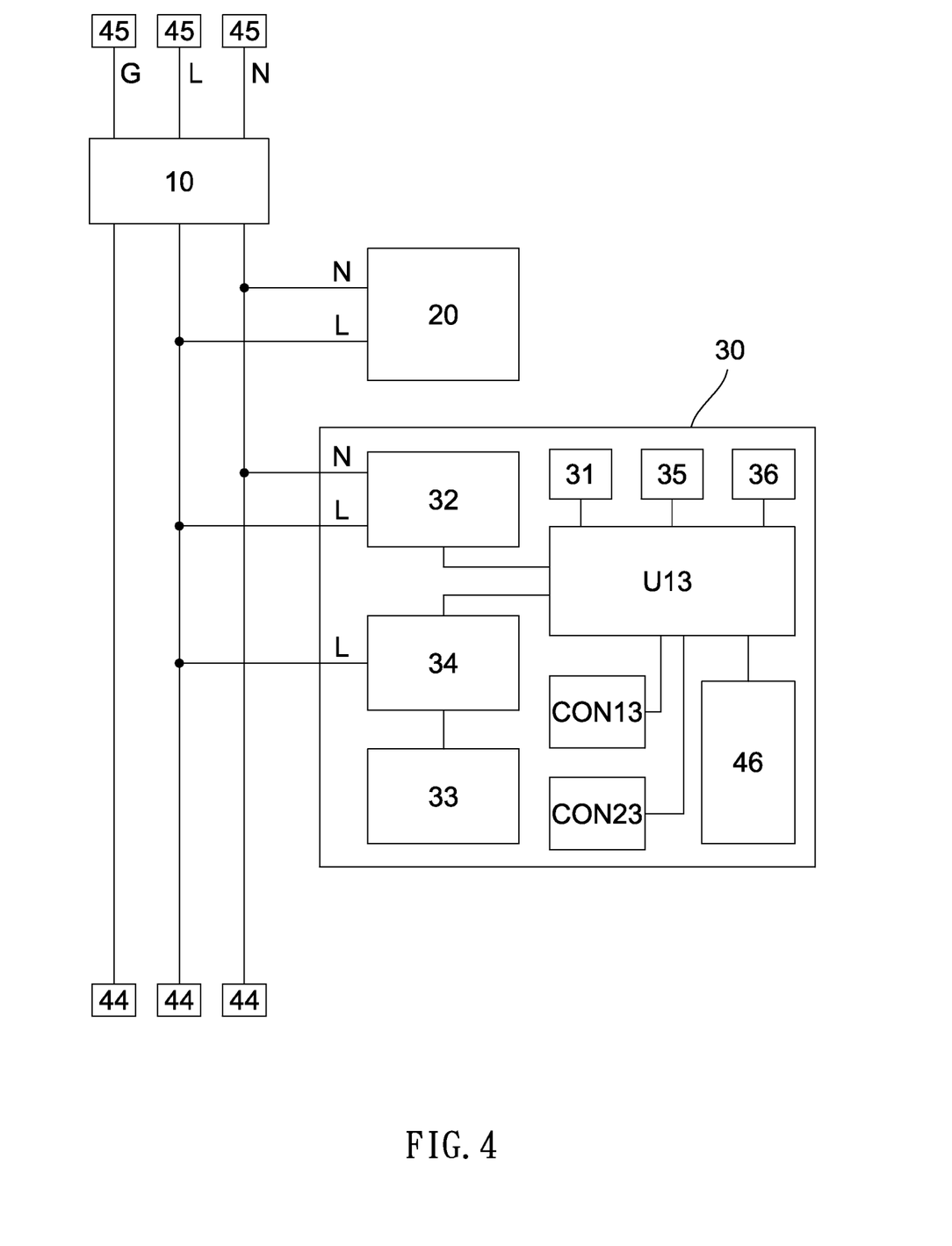
FIG. 4 is a block diagram of the socket.

As shown in FIG. 4, an external power source (e.g., main electricity) is electrically connected to two of the line contacts 45 (i.e., line (L) contact and neutral (N) contact) with ground (G) representing ground line. Three mail connectors of a plug can be inserted into the female contact elements 44 for electrical connection. The female contact elements 44 are adapted to connect to type A plug as shown. But other types of plug such as B, C, D, G, H, I, J, K, L, and M are also adapted to insert into the female contact elements 44. Alternatively, the female contact elements 44 may be replaced by another type of female contact elements. The surge protection module 10 is electrically interconnected the line contacts 45 and the female contact elements 44. The count power module 20 is electrically connected to L and N. The count display module 30 is electrically connected to L and N.

Figure 5:
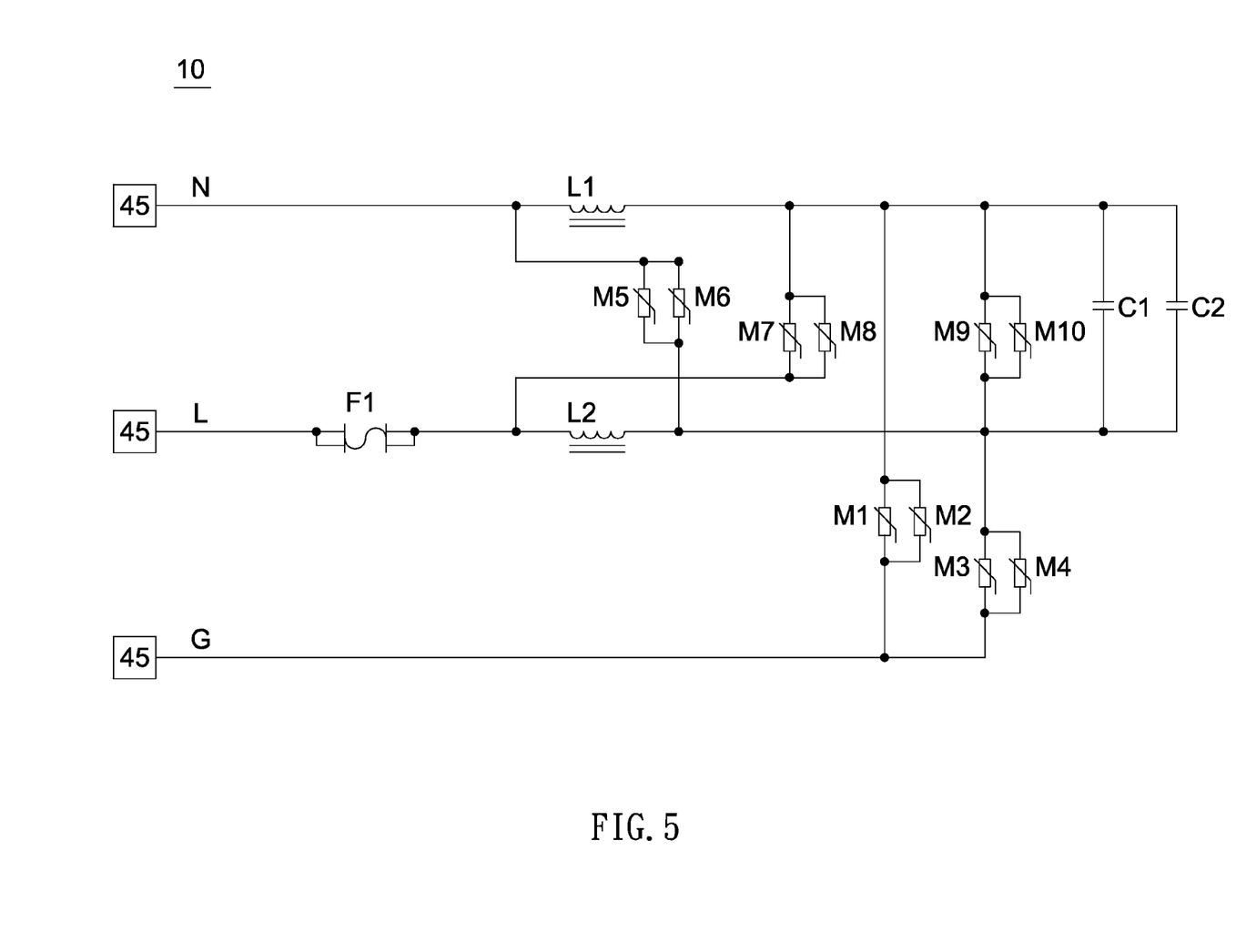
FIG. 5 is a circuit diagram of the surge protection module.

As shown in FIG. 5, the surge protection module 10 is provided on the rear board 431 and electrically connected to N, L, and G. The surge protection module 10 includes a circuit breaker F1, a first surge protection pair M1 and M2, a second surge protection pair M3 and M4, a third surge protection pair M5 and M6, a fourth surge protection pair M7 and M8, and a fifth surge protection pair M9 and M10, a first capacitor C1, a second capacitor C2, a first inductor L1, and a second inductor L2. The circuit breaker F1 is electrically connected to L. The circuit breaker F1 is an automatically operated electrical switch designed to protect the surge protection module 10 from damage caused by overload or short circuit. The circuit breaker F1 can detect a fault condition and interrupt current flow through L. The circuit breaker F1 is a current-limiting fuse in the invention.

The first inductor L1 is electrically connected to N and the second inductor L2 is electrically connected to L. The first and second inductors L1, L2 are served as electronic filters to separate signals of different frequencies. Both terminals of the first surge protection pair M1, M2 are electrically connected to L and G respectively. Both terminals of the second surge protection pair M3, M4 are electrically connected to L and G respectively. Both terminals of the third surge protection pair M5, M6 are electrically connected to L and N respectively. Both terminals of the fourth surge protection pair M7, M8 are electrically connected to L and N respectively. Both terminals of the fifth surge protection pair M9, M10 are electrically connected to L and N respectively.

Each of the surge protection pairs M1, M2, M3, M4, M5, M6, M7, M8, M9 and M10 is a voltage-dependent resistor (VDR). VDRs are used as control or compensation elements in circuits either to provide optimal operating conditions or to protect against excessive transient voltages. When used as protection devices, they shunt the current created by the excessive voltage away from sensitive components when triggered. The VDRs are implemented as meal oxide varistors (MOVs) having a high electrical resistance at low voltage and a low electrical resistance at high voltage. The provision of the surge protection pairs M1, M2, M3, M4, M5, M6, M7, M8, M9 and M10 can greatly absorb voltage spikes for protecting the circuit. Thus, the socket can withstand lightning flash surge (LFS), power switching surge (PSS), and electromagnetic pulse (EMP). Both terminals of the first capacitor C1 (or the second capacitor C2) are electrically connected to L and N for high frequency filter and spark elimination purposes.

Figure 6:
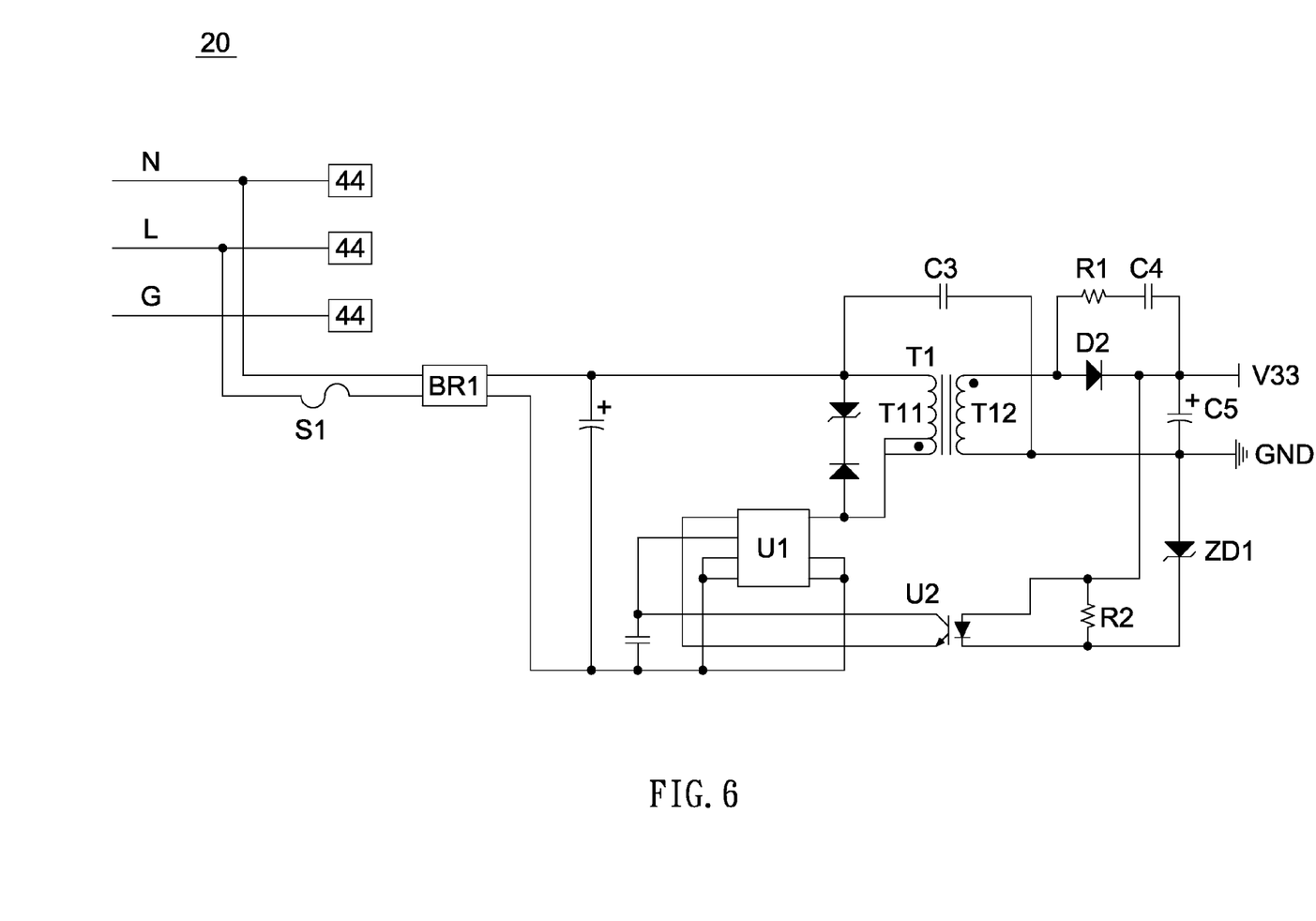
FIG. 6 is a circuit diagram of the count power module.

As shown in FIG. 6, the count power module 20 is electrically connected to the surge protection module 10 and is provided on the intermediate board 432. The count power module 20 is manufactured by Power Integrations, Inc. and has 85-265VAC input and DC 5V/300 mA output. Fuse S1 is electrically connected to L for overload protection. Bridge rectifier BR1 has one terminal electrically connected to N and the other terminal electrically connected to L via the fuse S1. The bridge rectifier BR1 can convert alternating current (AC) to direct current (DC) which is supplied to primary winding T11 of a transformer T1. Integrated circuit (IC) U1 is electrically interconnected the bridge rectifier BR1 and the primary winding T11 of the transformer T1. IC U2 is electrically interconnected the secondary winding T12 of the transformer T1 and the IC U1. Thus, a circuit is formed. Zener diode ZD1 and a second resistor R2 are electrically interconnected the IC U2 and the secondary winding T12. DC output is determined by the Zener diode ZD1, the second resistor R2, and the LED voltage drop of the IC U2. The transformer T1 is in parallel connection to a third capacitor C3 for eliminating electromagnetic interference (EMI). The secondary winding T12 is electrically connected to the first resistor R1 and a fourth capacitor C4 for diverting voltage spikes to ground. Second diode D2 is connected to the secondary winding T12 in series. A fifth capacitor C5 is connected across the secondary winding T12 for filtering so that DC can be outputted from the secondary winding T12.

Operations of the count power module 20 are described in detail below. LED current of the IC U2 may increase when the output voltage of the secondary winding T12 increases to a value above a safe threshold. And in turn, feedback current of the IC U1 may increase. Thus, the IC U1 is turned off. LED current of the IC U2 may decrease when the output voltage of the secondary winding T12 decreases to a value under a safe threshold. And in turn, feedback current of the IC U1 decreases. Thus, the IC U1 is turned on. As a result, a constant DC is outputted.

The count display module 30 is electrically connected to the surge protection module 10 and the count power module 20 respectively and provided on the front board 433. The count display module 30 includes a central processing unit (CPU) U13, an operation display circuit 31, a power circuit 32, a trigger signal display circuit 33, a surge detecting circuit 34, a count storage circuit 35, a count reset circuit 36, and a liquid crystal display (LCD) 46. The surge detecting circuit 34 is provided on the intermediate board 432.

Figure 1:
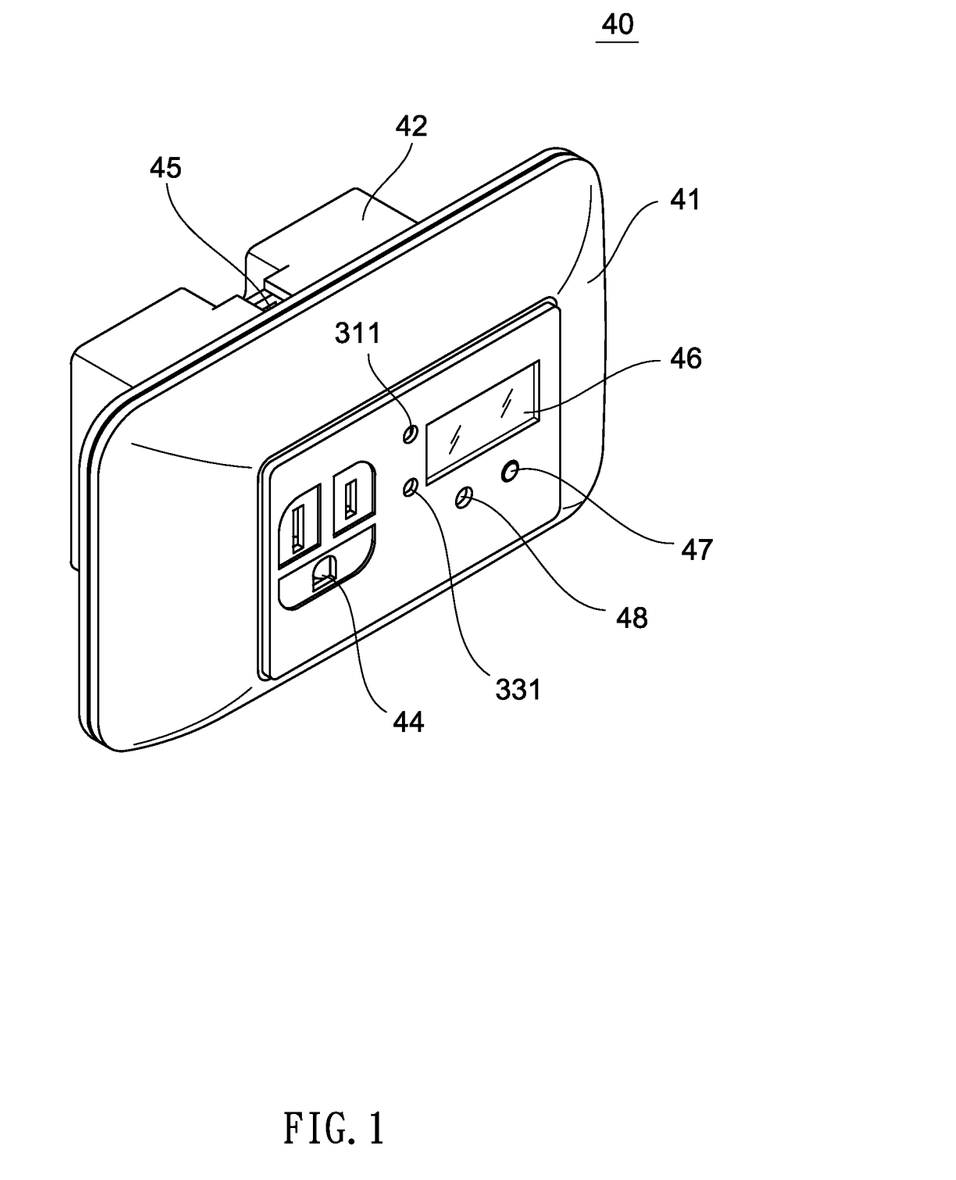
FIG. 1 is a perspective view of an electrical socket according to the invention.
Figure 2:
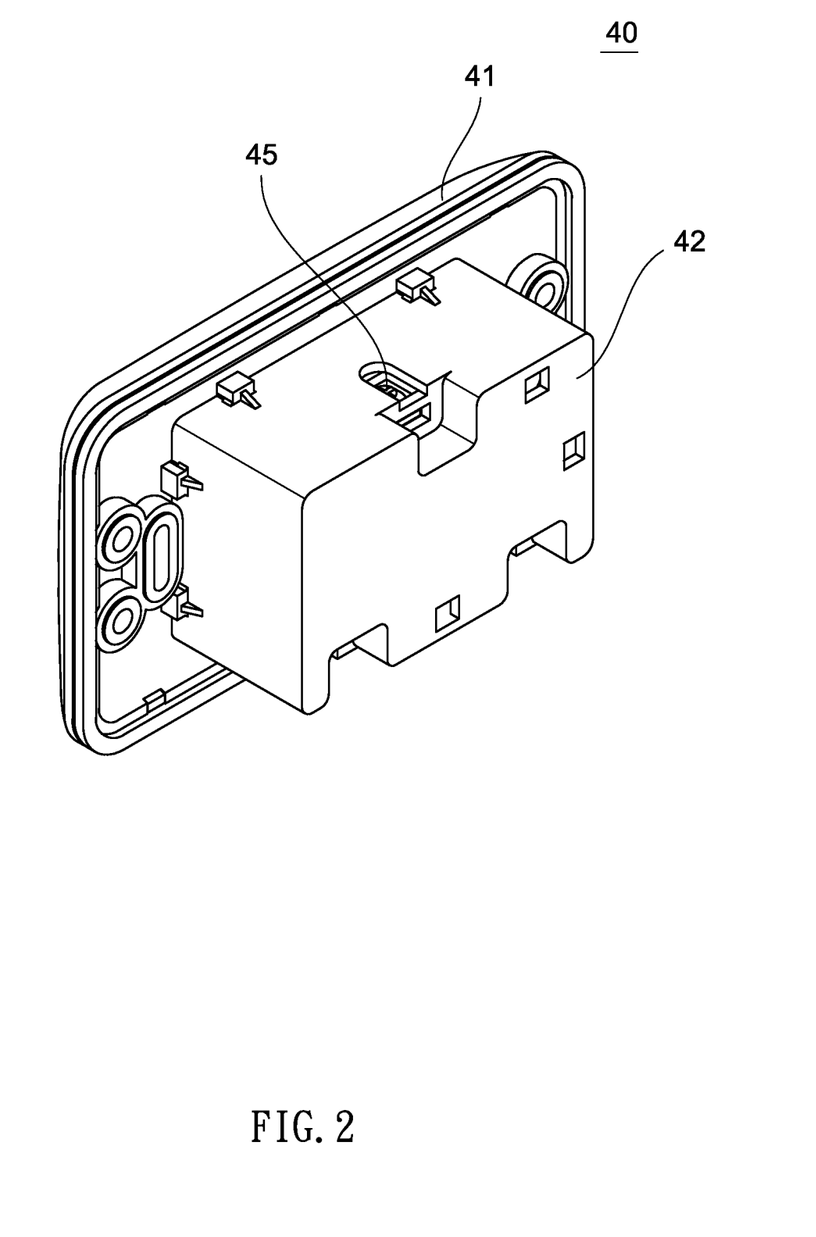
FIG. 2 is another perspective view of the socket taken from the rear.
Figure 3:
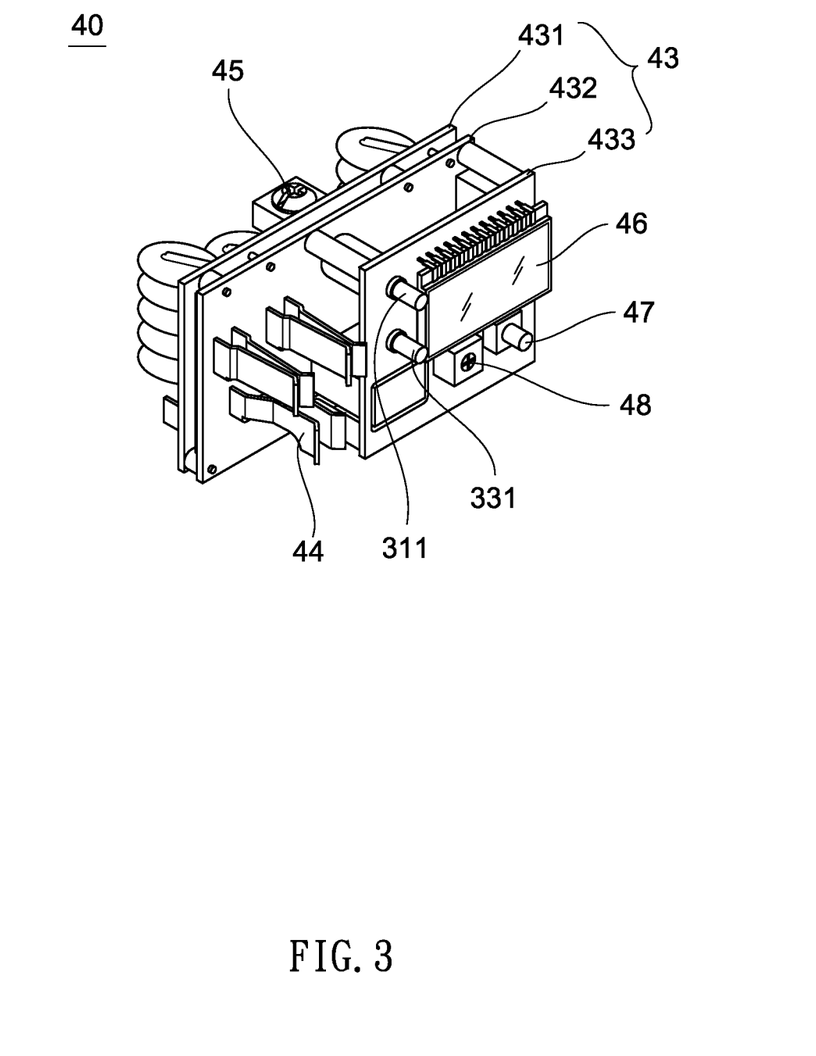
FIG. 3 is a perspective view of the socket with the front and rear cover plates removed.
Figure 7A:
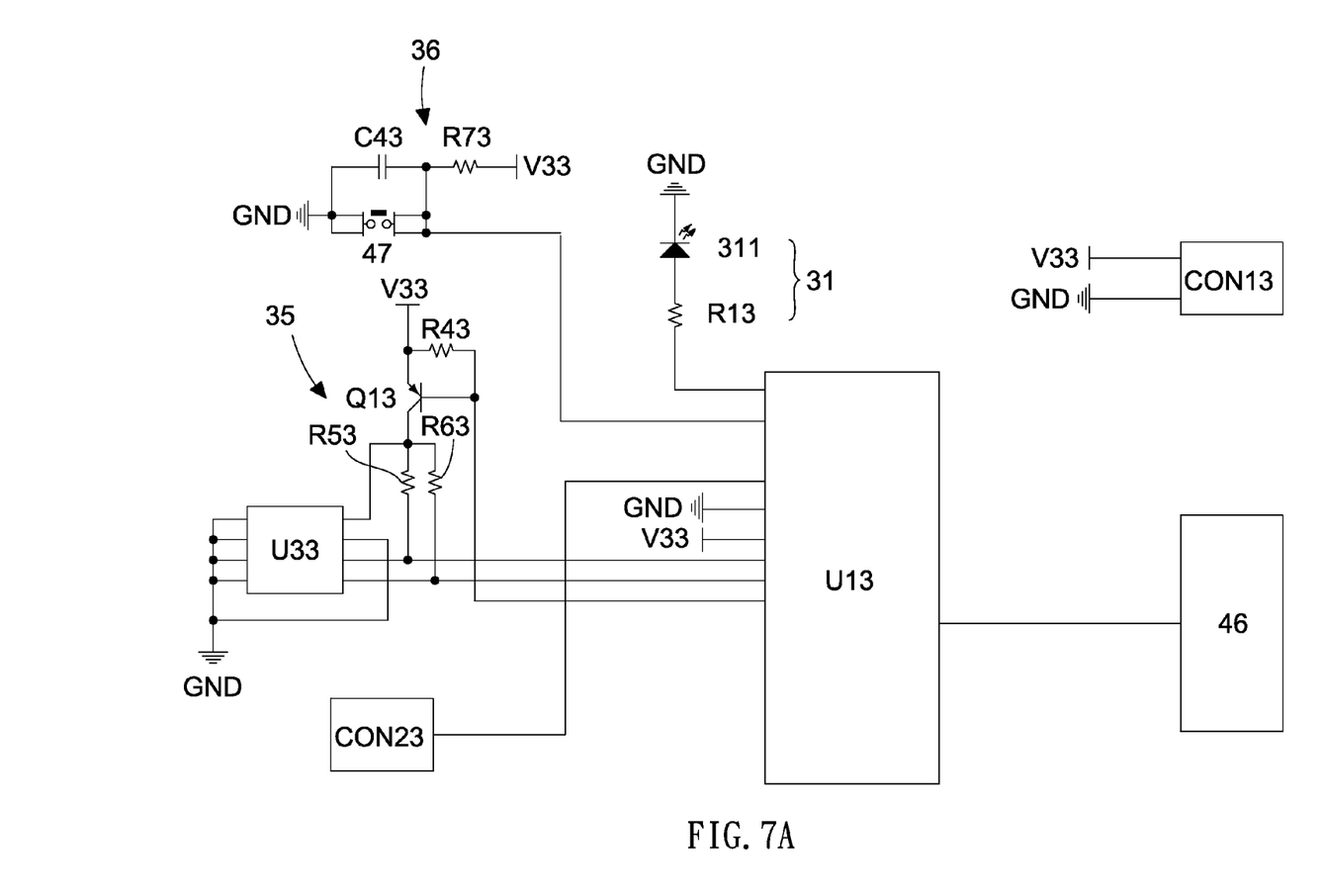
FIGS. 7A, 7B and 7C are circuit diagrams of different components of the count display module respectively.

As shown in FIG. 7A, the operation display circuit 31 includes a first resistor R13 electrically connected to the CPU U13, and a light-emitting diode (LED) 311 electrically connected to the first resistor R13 which serves as bias. The LED 311 may emit light to indicate that the CPU U13 is operating. As shown in FIG. 1, the LED 311 is provided on the cover plate 41 for visually indicating the CPU U13 is operating or not.

Figure 7B:
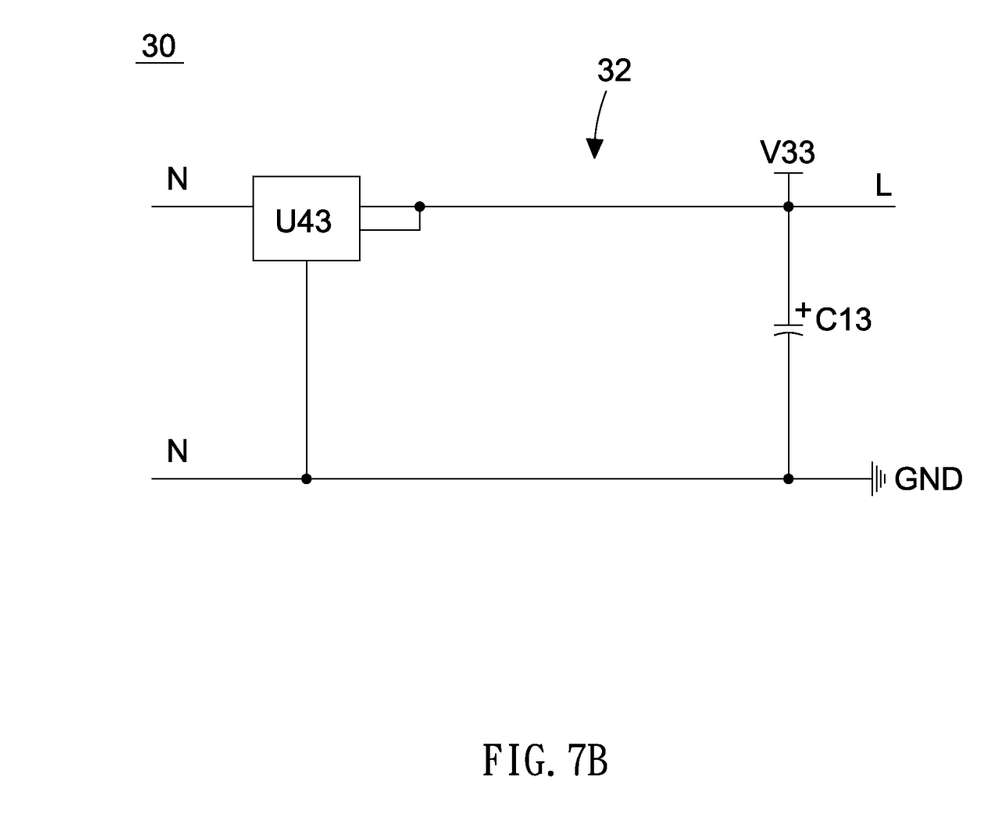

As shown in FIG. 7B, a voltage regulator U43 is electrically connected to N, L, and the CPU U13 respectively and implemented by a low dropout regulator (LDR). The voltage regulator U43 is electrically connected to the first capacitor C13 to constitute the power circuit 32 which supplies 3.3V to the CPU U13. The first capacitor C13 functions to improve transient response and stability.

Figure 7C:
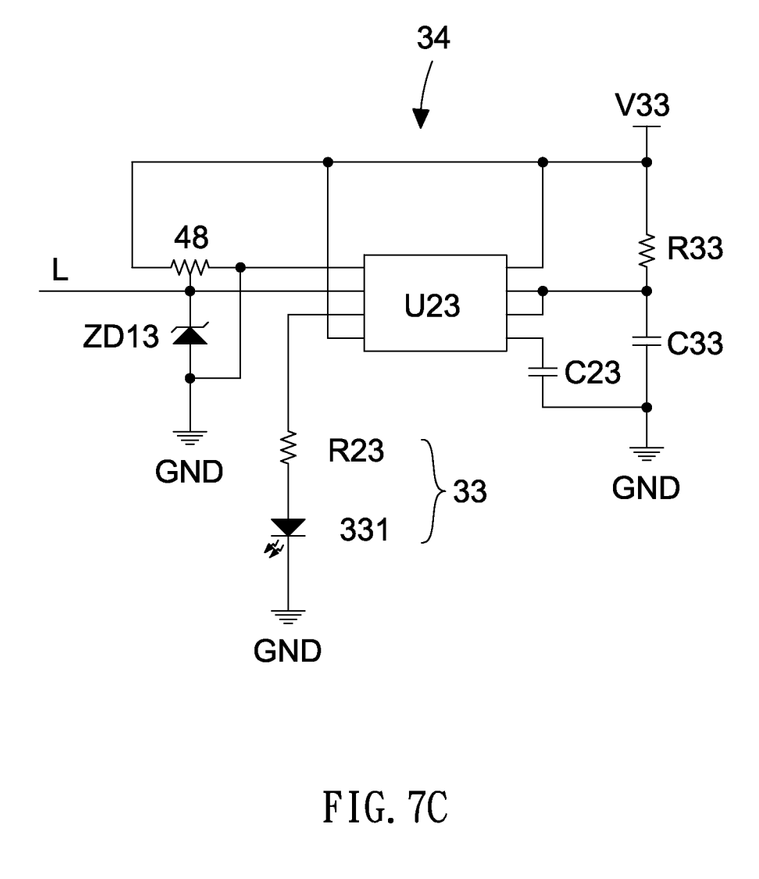

As shown in FIG. 7C, the trigger signal display circuit 33 includes a second resistor R23 and an LED 331 electrically connected together. The second resistor R23 is electrically connected to the surge detecting circuit 34 for bias. The second LED 331 may emit light to indicate that spike voltage is applied to the surge protection module 10. As shown in FIG. 1, the LED 331 is provided on the cover plate 41 for visually indicating the occurrence of surge.

The surge detecting circuit 34 is electrically connected to L and the CPU U13 and includes a variable resistor (VR) 48, a first Zener diode ZD13, a timer U23, a second capacitor C23, a third resistor R33, and a third capacitor C33. The timer U23 electrically connected to the trigger signal display circuit 33. The timer U23 is implemented by a complementary metal-oxide semiconductor (CMOS). The VR 48 can adjust voltage, i.e., adjusting sensitivity. The first Zener diode ZD13 can limit a maximum voltage. The second capacitor C23, the third resistor R33, and the third capacitor C33 constitute a single transient trigger circuit in which the third resistor R33 and the third capacitor C33 can adjust response time. As shown in FIG. 1, the VR 48 is provided on the cover plate 41 for visually indicating trigger sensitivity.

As shown in FIG. 7A, the count storage circuit 35 is electrically connected to the CPU U13 and includes a random access memory (RAM) U33, a first transistor Q13, a fourth resistor R43, a fifth resistor R53, and a sixth resistor R63. The first transistor Q13 and the fourth resistor R43 are used to control current of the RAM U33. The fifth resistor R53 and the sixth resistor R63 are used to increase resistance for signal voltage. The RAM U33 is implemented by a ferroelectric RAM which uses the ferroelectric effect to produce low density RAM. FRAM has characteristics of both read only memory (ROM) and RAM and can effect high speed write-in. FRAM also has advantages including robustness, low power consumption and being tamperproof.

As shown in FIG. 7A, the count reset circuit 36 is electrically connected to the CPU U13 and includes a reset button 47, a fourth capacitor C43, and a seventh resistor R73. The fourth capacitor C43 can filter noise. The seventh resistor R73 can reset count by increasing resistance. The reset button 47 is provided on the cover plate 41 for resetting count as shown in FIG. 1.

As shown in FIG. 7A, the display 46 is electrically connected to the CPU U13 and is implemented by a seven-segment display. The display 46 is provided on the cover plate 41 for visually display count of surge occurrence.

Operations of the count display module 30 are described in detail below. The surge detecting circuit 34 samples surge signals when voltage spikes apply to the surge protection module 10. The second LED 331 of the trigger signal display circuit 33 is conducted after a predetermined delay. The conducted second LED 331 may emit light. The CPU U13 may count the number of occurrence of the voltage spikes and the count is displayed on the display 46. Also, the count is stored in the RAM U33 of the count storage circuit 35. In response to supplying electricity again, the CPU U13 reads the count stored in the RAM U33 and displays same on the display 46. For resetting the count to zero, a person may press the reset button 47 of the count reset circuit 36. The CPU U13 is electrically connected to a first interface CON13 for downloading software and electrically connected to a second interface CON23 for communication (see FIG. 7A).

The socket of the invention has the following advantages: The circuit breaker F1 can protect the surge protection module 10 from damage caused by overload or short circuit by detecting a fault condition and interrupting current flow through line. The first LED 311 may emit light to indicate that the CPU U13 is operating. The conducted second LED 331 may emit light to indicate that voltage spikes occur in the surge protection module 10. The first LED 311 and the second LED 331 are dimmed when current is interrupted by the circuit breaker F1 or power supplied to G, N and L is interrupted so that status of the socket 40 can be visually determined. Both terminals of the first surge protection pair M1, M2 are electrically connected to L and G respectively, both terminals of the second surge protection pair M3, M4 are electrically connected to L and G respectively, both terminals of the third surge protection pair M5, M6 are electrically connected to L and N respectively, both terminals of the fourth surge protection pair M7, M8 are electrically connected to L and N respectively, and both terminals of the fifth surge protection pair M9, M10 are electrically connected to L and N respectively so that the surge protection module 10 can be protected from voltage spikes. The CPU U13 counts the number of occurrence of the voltage spikes and the count is displayed on the display 46. The RAM U33 has a non-volatile memory for storing surge data so that data stored in the RAM U33 can be displayed on the display 46 again even after power is interrupted. A pressing of the reset button 47 resets the count. The variable resister 48 of the surge detecting circuit 34 can adjust voltage, i.e., adjusting sensitivity.

While the invention has been described in terms of preferred embodiments, those skilled in the art will recognize that the invention can be practiced with modifications within the spirit and scope of the appended claims.

What is claimed is:

1. An electrical socket comprising:
a ground;
a neutral;
a line;
a plurality of female contact elements electrically connected to the ground, the neutral, and the line;
a plurality of line contacts electrically connected to the ground, the neutral, and the line;
a surge protection module electrically connected to the ground, the neutral, and the line, the surge protection module including a plurality of surge protection pairs;
a count power module electrically connected to the surge protection module and including a bridge rectifier for converting alternating current (AC) to direct current (DC) as output; and
a count display module including a central processing unit (CPU) electrically connected to the output of the count power module, a surge detecting circuit electrically connected to the surge protection module for detecting a surge signal, and electrically connected to the CPU to send the detected surge signal to the CPU, and a display electrically connected to the CPU for displaying a count of the detected surge signal calculated by the CPU;
wherein the count display module further comprises an operation display circuit electrically connected to the CPU and including a first resistor electrically connected to the CPU, and a first LED electrically connected to the first resistor; a voltage regulator electrically connected to the neutral, the line, and the CPU respectively and including a first capacitor; a trigger signal display circuit electrically connected to the surge detecting circuit and including a second resistor electrically connected to the CPU, and a second LED electrically connected to the second resistor; a count storage circuit electrically connected to the CPU and including a random access memory (RAM) for storing the count of the detected surge signal, a first transistor, a fourth resistor, a fifth resistor, and a sixth resistor electrically interconnected; and a count reset circuit electrically connected to the CPU and including a reset button, a fourth capacitor, and a seventh resistor electrically interconnected; and
wherein the surge detecting circuit includes a variable resistor (VR), a first Zener diode, a timer, a second capacitor, a third resistor, and a third capacitor electrically interconnected.

2. An electrical socket comprising:
a ground;
a neutral;
a line;
a plurality of female contact elements electrically connected to the ground, the neutral, and the line;
a plurality of line contacts electrically connected to the ground, the neutral, and the line;
a surge protection module electrically connected to the ground, the neutral, and the line, the surge protection module including a plurality of surge protection pairs;
a count power module electrically connected to the surge protection module and including a bridge rectifier for converting alternating current (AC) to direct current (DC) as output;
a front cover plate;
a count display module including a central processing unit (CPU) electrically connected to the output of the count power module, a surge detecting circuit electrically connected to the surge protection module for detecting a surge signal, and electrically connected to the CPU to send the detected surge signal to the CPU, and a display electrically connected to the CPU for displaying a count of the detected surge signal calculated by the CPU, a first LED disposed on the cover plate, a second LED disposed on the cover plate, a reset button disposed on the cover plate, and a variable resistor (VR);
a rear housing releasably secured to the cover plate; and
a board assembly disposed in both the cover plate and the housing;
wherein the surge protection module, the count power module, and the count display module are disposed on the board assembly;
wherein the VR of the count display module is disposed on the cover plate;
wherein the display of the count display module is disposed on the cover plate;
wherein the female contact elements are disposed on the board assembly and are accessible through the cover plate; and
wherein the line contacts are disposed on the board assembly and are accessible through the housing.

3. The electrical socket of claim 1, further comprising:
a front cover plate;
a rear housing releasably secured to the cover plate; and
a board assembly disposed in both the cover plate and the housing;
wherein the surge protection module, the count power module, and the count display module are disposed on the board assembly;
wherein the first LED of the count display module is disposed on the cover plate;
wherein the second LED of the count display module is disposed on the cover plate;
wherein the VR of the count display module is disposed on the cover plate;
wherein the reset button of the count display module is disposed on the cover plate;
wherein the display of the count display module is disposed on the cover plate;
wherein the female contact elements are disposed on the board assembly and are accessible through the cover plate; and
wherein the line contacts are disposed on the board assembly and are accessible through the housing.

* * * * *